(12) United States Patent
Busser et al.

(10) Patent No.: US 7,107,320 B2
(45) Date of Patent: Sep. 12, 2006

(54) DATA MIRRORING BETWEEN CONTROLLERS IN AN ACTIVE-ACTIVE CONTROLLER PAIR

(75) Inventors: Richard W. Busser, Longmont, CO (US); Ian R. Davies, Longmont, CO (US)

(73) Assignee: Dot Hill Systems Corp., Carlsbad, CA (US)

( * ) Notice: Subject to any disclaimer, the term of this patent is extended or adjusted under 35 U.S.C. 154(b) by 864 days.

(21) Appl. No.: 10/008,987

(22) Filed: Nov. 2, 2001

(65) Prior Publication Data

US 2003/0101228 A1    May 29, 2003

(51) Int. Cl.
*G06F 15/167* (2006.01)
(52) U.S. Cl. .................. 709/213; 709/214; 709/248; 711/114; 711/162
(58) Field of Classification Search ................ 709/213, 709/214, 234, 248, 223; 711/114, 162; 707/201, 707/204
See application file for complete search history.

(56) References Cited

U.S. PATENT DOCUMENTS

| | | | | |
|---|---|---|---|---|
| 5,724,501 A | | 3/1998 | Dewey et al. | |
| 5,742,792 A | * | 4/1998 | Yanai et al. | 711/162 |
| 5,987,566 A | * | 11/1999 | Vishlitzky et al. | 711/114 |
| 6,073,209 A | * | 6/2000 | Bergsten | 711/114 |
| 6,199,074 B1 | * | 3/2001 | Kern et al. | 707/204 |
| 6,279,078 B1 | | 8/2001 | Sicola et al. | |
| 6,321,298 B1 | * | 11/2001 | Hubis | 711/124 |
| 6,467,034 B1 | * | 10/2002 | Yanaka | 711/162 |
| 6,502,205 B1 | * | 12/2002 | Yanai et al. | 714/7 |
| 6,574,709 B1 | * | 6/2003 | Skazinski et al. | 711/162 |
| 6,708,285 B1 | * | 3/2004 | Oldfield et al. | 714/11 |
| 6,718,347 B1 | * | 4/2004 | Wilson | 707/201 |
| 6,732,243 B1 | | 5/2004 | Busser et al. | |
| 6,735,636 B1 | * | 5/2004 | Mokryn et al. | 711/118 |
| 2002/0097687 A1 | * | 7/2002 | Meiri et al. | 370/254 |
| 2002/0133735 A1 | * | 9/2002 | McKean et al. | 714/5 |

OTHER PUBLICATIONS

"International Search Report for PCT Application No. 02/35160", 4 pages.

* cited by examiner

*Primary Examiner*—Philip B. Tran
(74) *Attorney, Agent, or Firm*—Sheridan Ross P.C.

(57) ABSTRACT

A data storage system that includes first and second controllers is provided. Data is mirrored from one controller to the other controller according to different steps depending on the amount of data to be mirrored. When the data to be mirrored is less than or equal to a predetermined number of bytes, one less interrupt is generated than when the data to be mirrored is greater than the predetermined number of bits.

16 Claims, 7 Drawing Sheets

DATA MIRRORING BETWEEN CONTROLLERS IN AN ACTIVE-ACTIVE CONTROLLER PAIR

FIELD OF THE INVENTION

The present invention relates to performance enhancements for redundant array of inexpensive disks (RAID) storage systems and more particularly to a method and system for enhancing performance of mirroring operations between controllers in an active-active controller pair.

BACKGROUND OF THE INVENTION

A typical data processing system generally includes one or more storage units or devices which are connected to a host computer either directly or through a control unit and a channel. The function of the storage units is to store user data and other information (e.g., program code) which the host computer uses in performing particular data processing tasks.

Various types of storage units are used in current data processing systems. A typical system may include one or more large capacity tape units and/or disk drives connected to the system through respective control units for storing data. However, a problem exists if one of the storage units fails such that information contained in that unit is no longer available to the system. Generally, such a failure will shut down the entire computer system, which can create a problem for systems which require data storage systems to have high availability.

This problem has been overcome to a large extent by the use of Redundant Array of Inexpensive Disks (RAID) systems. RAID systems are widely known, and several different levels of RAID architectures exist, including RAID 1 through RAID 5, which are also widely known. A key feature of a RAID system is redundancy, which is achieved through the storage of a data file over several disk drives and parity information stored on one or more drives. If one disk drive fails, then the RAID system is able to reconstruct the data which was stored on the failed drive from the remaining drives in the array.

High availability is a key concern because in many applications users rely heavily on the user data stored on the RAID system. In these type of applications, unavailability of data stored on the RAID system can result in significant loss of revenue and/or customer satisfaction. Employing a RAID system in such an application enhances availability of the stored user data, since if a single disk drive fails, user data may still be stored and retrieved from the system. In addition to the use of a RAID system, it is common to use redundant RAID controllers to further enhance the availability of such a storage system. In such a situation, two or more controllers are used in a RAID system, where if one of the controllers fails the other remaining controller will assume operations for the failed controller. Such a platform enhances the availability of a RAID system because the system can sustain a failure of a controller and continue to operate. When using multiple controllers, each controller may conduct independent read and write operations simultaneously, known as active-active configuration. It can be advantageous in many applications to use the active-active configuration, as such a RAID system can support higher rates of data transfer between the disks and host. However, employing an active-active configuration requires mirroring of user data and parity between controllers to maintain redundancy, such that if one controller fails, the remaining controller can continue operations of the system without any user data loss.

With reference to FIG. 1, a RAID system 10 having an active-active controller pair is described. The RAID system 10 is connected to a host computer 14 through a host channel 18. The RAID system 10 includes a first active controller 22, a second active controller 26, and a disk array 30. The disk array 30 is connected to the first active controller 22 and the second active controller 26 by a disk channel 34. The disk array 30 contains a number of disk drives 42, 46, 50, 54, 58, that are used for data storage. Within the first active controller 22, there is a processor 62 and a nonvolatile random access memory (NVRAM) 66 which has a first region 70 and a second region 74. Within the second active controller 26 there is a processor 78 and a NVRAM 82 which has a first region 86 and a second region 90. It should be understood that the number of drives shown in FIG. 1 are for the purpose of discussion only, and that a RAID system 10 may contain more or fewer disk drives than shown in FIG. 1. User data is written to the disk array 30 in such a way that if one drive fails, user data can continue to be read from and written to the disk array 30. How this redundancy is accomplished depends upon the level of RAID architecture used, and is well known in the art.

When storing user data, generally, a controller receives the user data and breaks the user data down into chunks which will be stored on the individual disk drives 42, 46, 50, 54, 58. A chunk of data is the portion of the user data that can be stored on an individual disk drive. The chunks of data are then arranged to be stored on the drives 42, 46, 50, 54, 58. In arranging the chunks of data, the controller organizes the chunks into stripes and generates parity for each stripe. The chunks of data are written across several drives, and the parity for that stripe is written to one disk drive.

As mentioned above, when using an active-active controller pair in a RAID system, in order to maintain redundancy, data and parity must be mirrored between the controllers in the active-active system. In such a system, when the host computer 14 sends user data to be written to the disk array 30, the user data is typically sent to either the first active controller 22, or the second active controller 26. Which controller the user data is sent to depends upon a number of factors, including the LUN the user data will be written to. A LUN is a SCSI term referring to a unit containing addressable storage, with each controller typically being assigned to or owning one or more of a number of LUNs. Thus, if the user data is to be written to a LUN that the first active controller 22 owns, the user data is sent to the first active controller 22. Likewise, if the user data is to be written to a LUN that the second active controller 26 owns, the user data is sent to the second active controller 26. In order to maintain redundancy between the two controllers 22, 26, the user data sent to the first active controller 22 must be copied onto the second active controller 26. Likewise, any user data sent to the second active controller 26 is copied onto the first active controller 22. The user data is copied between controllers because, for example, if the first active controller 22 suffers a failure, the second active controller 26 can then use the copy of the user data to complete any data writes which were outstanding on the first active controller 22 when it failed. This process of copying user data, as well as parity, between active controllers is known as mirroring.

Mirroring in such a system is typically necessary because when the host 14 sends user data to be written, the controller that receives the user data stores the user data in a memory location, and sends a reply to the host 14 that the write is complete. Thus, even though the user data may not have been written to the disk array 30, the host 14 is notified that it has been written. If the controller that received the user data subsequently suffers a failure prior to writing the user data to the disk array 30, the data can be lost. However, if the controller mirrors the user data prior to sending the host 14 a reply that the data has been written, a failure of the controller can still be recovered without loss of the data, using the copy of the user data that was mirrored to the other controller.

In many RAID applications, the controller(s) communicate with the host computer and disks using a Small Computer System Interface (SCSI) bus architecture. SCSI systems are widely available, with a variety of SCSI controllers available. Different components within a SCSI system communicate using either SCSI commands, or SCSI data transfers. SCSI commands are generally 10 byte or 12 byte command blocks, with command blocks of up to 16 bytes (128 bits) available in certain applications. Many SCSI controllers can process SCSI commands of up to 12 bytes without having to treat the command in a special manner. In these types of systems, SCSI commands of greater than 12 bytes are treated differently, often requiring processor attention for each individual byte of command beyond 12 bytes.

SCSI data transfers are used to transfer data between components in a SCSI system. A SCSI data transfer is generally required when a block of data needs to be transferred. When initiating a SCSI data transfer, the SCSI controller receiving the data transfer must be notified that the data is coming, in order to prepare to receive the data. Thus, a data transfer in a SCSI system in generally at least a two step process, a SCSI command is first sent to the receiving SCSI controller, followed by one or more SCSI data transfers.

When mirroring data between controllers 22, 26, several operations are performed by each controller 22, 26. With reference now to FIG. 2, a flow chart representation of a data mirroring operation is described. Initially, indicated by block 200, the host computer 14 sends user data to the first active controller 22, which opens a write operation. Next, as noted by block 204, the first active controller 22 sends a notification mirror message, which causes an interrupt, to the second active controller 26, notifying the second active controller 26 that data is going to be mirrored. An interrupt is a signal sent from a device, in this example the first active controller 22, to a processor, in this example the processor 78 portion of the second active controller 26, which causes the processor 78 to stop what it is doing and service the interrupt. When the second active controller 26 receives the interrupt, it discontinues any processing activity, and processes the notification mirror message. The notification mirror message is a SCSI command, and will be described in more detail below. Next, as indicated by block 208, the first active controller 22 sends a metadata mirror message including metadata, which causes an interrupt, to the second active controller 26. The metadata mirror message is a data transfer between controllers, will be described in more detail below. The second active controller 26 then marks its NVRAM 82 as invalid for the data blocks specified in the metadata, as noted by block 212. Next at block 216, the first active controller 22 sends a data mirror message containing the user data, which causes an interrupt, to the second active controller 26. The data mirror message is a data transfer between controllers, which contains the actual user data. The second active controller 26 receives the user data, stores it in the appropriate NVRAM 82 location, marks the NVRAM 82 as valid for the associated data blocks, as indicated by block 220. At block 224, the second active controller 26 sends a status message to the first active controller 22, indicating that the data was received and stored. The first active controller 22 upon receiving the status message sends the host computer 14 an indication that the write is complete, and terminates the write operation as noted by block 228. The first active controller 22, at block 223, then writes the user data to the disk array 30. As can be seen from this example, the controller receiving the mirrored data receives at least four interrupts. At least two interrupts associated with data transfers between controllers, and two interrupts associated with SCSI commands which indicate mirroring operation are starting or are complete. As will be understood by those of skill in the art, a processor may disconnect during a data transfer. In such a situation, the sending controller will, after a predetermined time, resume sending the data, causing an additional interrupt. Thus, the minimum number of interrupts associated with a data transfer as described will be four interrupts, with additional interrupts possible if there are disconnects between the controllers when data is being transferred.

As described above with reference to block 208, the first active controller 22 sends a notification mirror message, which causes an interrupt, to the second active controller 26. The notification mirror message serves to simply place the second active controller 26 on notice that metadata is going to be mirrored. A separate notification mirror message is required because, as described above, prior to the metadata mirror message, the second active controller 26 needs to be aware a data transfer is coming. The notification mirror message is typically a 10 byte SCSI command, with the first byte containing a predefined hexadecimal number, for example 3C. When the second active controller 26 receives the notification mirror message and interrupt, it discontinues any operations that it was conducting to service the interrupt. The second active controller 26 then processes the notification mirror message and reads the hexadecimal number in the first byte. When the second active controller 26 reads the predefined hexadecimal number, 3C in this example, it recognizes this as a mirror notification command, and disregards the remaining 9 bytes of the notification mirror message. The second active controller 26 then prepares to receive the data transfer of the metadata mirror message from the first active controller 22.

With reference now to FIG. 3, a metadata mirror message 300 is now described. The metadata mirror message 300 is a SCSI data transfer, which contains a first data region 304 and a second data region 308. The first data region 304 in this example is a 512 byte structure which contains several information fields. The information fields of the first data region 304 include a 16-bit message type 312 field, which contains information which indicates that the message contains metadata. The next field is a 16-bit message length 316 field, which contains information on the length of the current message. Following the message length 316 field, is a 32-bit sequence information 320 field, which in one example contains a number which is incremented during each mirror message, and is primarily used for troubleshooting purposes. The next field is a 32-bit starting logical block address (LBA) 324 field, which contains the starting LBA in the disk array 30 where the user data will be written. Following the starting LBA 324 field is a 32-bit number of blocks 328 field, which contains information on the number of blocks of user data to be mirrored. The next field is an 8-byte array serial number 332 field. In many applications, the disk array 30 contains several arrays of disk drives, with each array of disk drives having a unique array serial number. The array serial number field 332 contains the serial number of the array to which the user data is to be written. Following the array serial number field 332 is an 8-bit memory region field 336, which contains information on the region of NVRAM 66 that the data is to be stored in, the first region 86 or the second region 90. Following the memory region 336 field is an 8-bit array number 340 field. In many applications, each array of disk drives within the disk array 30 may contain several RAID arrays. Each RAID array is given an array number, such that if a controller 22, 26 knows the array serial number and array number, it can read and write data to and from the appropriate RAID array. Following the array number field 340, is a portion 344, which may contain data, used to fill out the 512 byte transfer.

The second data region 308 contains a 512 byte scatter/gather list 348. The scatter/gather list 348 is a list of scatter/gather elements 352. In the example of FIG. 3, the scatter/gather list 348 contains 64 scatter/gather elements 352. Each scatter/gather element 352 contains a 32-bit starting address field 356 and a 32-bit byte count field 360. The starting address field 356 contains the 32-bit address within the NVRAM 82 where the associated data will be stored. The byte count field 360 contains information on the number of bytes contained in the associated data. Thus, using the starting address field 356 and the byte count field 360, the portion of NVRAM 82 where the associated data will be stored is uniquely defined. Each scatter/gather element 352 is able to define the storage area for 16 Kbytes of user data. Thus, in the example shown, the metadata mirror message 300 can provide metadata for up to 1 Mbyte of user data. If more than 1 Mbyte of user data is sent to the controller 26 for storage, the controller 26 breaks the user data into separate pieces which are 1 Mbyte or less. The controller 26 uses the information contained in each scatter/gather element 352 to mark the appropriate portions of NVRAM 82 as invalid.

As mentioned above, the processor on the receiving controller is interrupted at least four times for each data write that is mirrored to it. Servicing these interrupts can take a significant portion of the processing resources of a controller. Additionally the metadata mirror message is 1 Kbyte, regardless of the size of the data write. Thus, for example, if 512 bytes of user data are received at the first active controller 22, the metadata mirror message will be 1 Kbyte. As can be seen, for small writes, mirroring a 1 Kbyte metadata message can be inefficient. Furthermore, when mirroring data, the controllers 22, 26 send the data over the disk channel 34, which typically have a maximum bandwidth of 160 Mb/s. When a RAID system is receiving many read and write requests from the host 14, the disk channel 34 can become bandwidth limited, increasing the time required to complete a read or write operation.

The occurrence of small writes is common in many applications, such as financial, reservation and retail systems, where relatively small data records are widely used and are accessed and modified at random. These applications are often very active as well, with many read and write requests sent to the RAID system within relatively short time periods. In these types of applications, it would be especially advantageous to reduce the processor overhead required for servicing interrupts, and to reduce the disk channel bandwidth used for mirroring data.

Thus, it would be advantageous to have a method and apparatus which (1) reduces the number of interrupts the processor of a receiving controller receives during mirroring operations, and (2) consumes less channel bandwidth when mirroring data between controllers of an active-active controller pair.

SUMMARY OF THE INVENTION

The present invention provides a system and method for mirroring data between controllers in an active-active controller pair. The system includes a first controller and a second controller. The first controller generates one of a first message or a second message depending on the amount of data to be sent by the first controller as part of a first mirroring operation. The second controller receives the data sent from the first controller. The first message includes all of the metadata for the first mirroring operation, and the second message includes less than all of the metadata for the first mirroring operation and typically has no metadata. One of the first message and the second message is the first communication from the first controller to the second controller for the first mirroring operation.

In one embodiment, the first message includes metadata and the number of bits contained in the first message relates to small system computer interface (SCSI) protocol. The first message includes metadata and command related information and, in one embodiment, the first message is no greater than 128 bits in length. When the second message is generated, the metadata is sent to the second controller in a metadata message, which is different than the first and second message. In one embodiment, when the first mirror message is generated, the first mirroring operation is associated with a first number of interrupts, and when the second message is sent, the first mirroring operation is associated with a second number of interrupts, with the second number of interrupts being greater than the first number of interrupts.

The method for providing enhanced mirroring between controllers of an active-active controller pair includes providing a message that includes metadata by a first controller to a second controller. The message including the metadata is less than 200 bits in length and is part of a first mirroring operation. After the first message is provided, the first mirroring operation is continued. In one embodiment, the first controller determines whether the data associated with the first mirroring operation is no greater than a predetermined number of bits. In one embodiment, the predetermined number of bits is no greater than 32 Kbytes. In another embodiment, the first controller communicates with the second controller using SCSI protocol and the number of bits in the message relates to the SCSI operations. Following the first message, the first controller continues the first mirroring operation by sending the second controller a second message that includes the data. In one embodiment, the message sent by the first controller is the first message sent by the first controller to the second controller for the first mirroring operation. In one embodiment, the first controller determines that second data associated with a second mirroring operation has a greater number of bits than a predetermined number of bits, and sends a second message to the second controller that does not include metadata. The minimum number of interrupts to complete the second mirroring operation is greater than the minimum number of interrupts to complete the first mirroring operation.

In yet another embodiment, a method for mirroring data between two controllers in a storage system includes making a determination related to the contents of a message to be sent by a first controller to a second controller as part of a first mirroring operation. A message is produced having contents that depend on the results of the determination. When the first controller determines that data to be sent is less than or equal to a predetermined number of bits, the message includes metadata. When the first controller determines that the data is greater than the predetermined number of bits, at least less than all of the metadata associated with the first mirroring operation is included with the message. The message is sent to the second controller and the second controller recognizes whether the message includes the metadata. In one embodiment, the message is the first message sent by the first controller to the second controller as part of the first mirroring operation. In this embodiment, the message causes a first interrupt to the second controller when the message includes metadata, and the first interrupt is one of at least three interrupts, with three interrupts being the minimum number of interrupts required to complete the first mirroring operation. In one embodiment, the first controller communicates with the second controller for the first mirroring operation using a SCSI protocol, and the predetermined number of bits depends on SCSI protocol operations.

Based on the foregoing, several benefits of the present invention are readily seen. The system causes fewer interrupts to the second controller when the data is less than or equal to the predetermined number of bytes, which may result in enhanced performance of the second controller. The system and method may also consume less channel bandwidth when conducting mirroring operations.

Additional advantages of the present invention will become readily apparent from the following discussion, particularly when taken together with the accompanying drawings.

DETAILED DESCRIPTION

Figure 1:
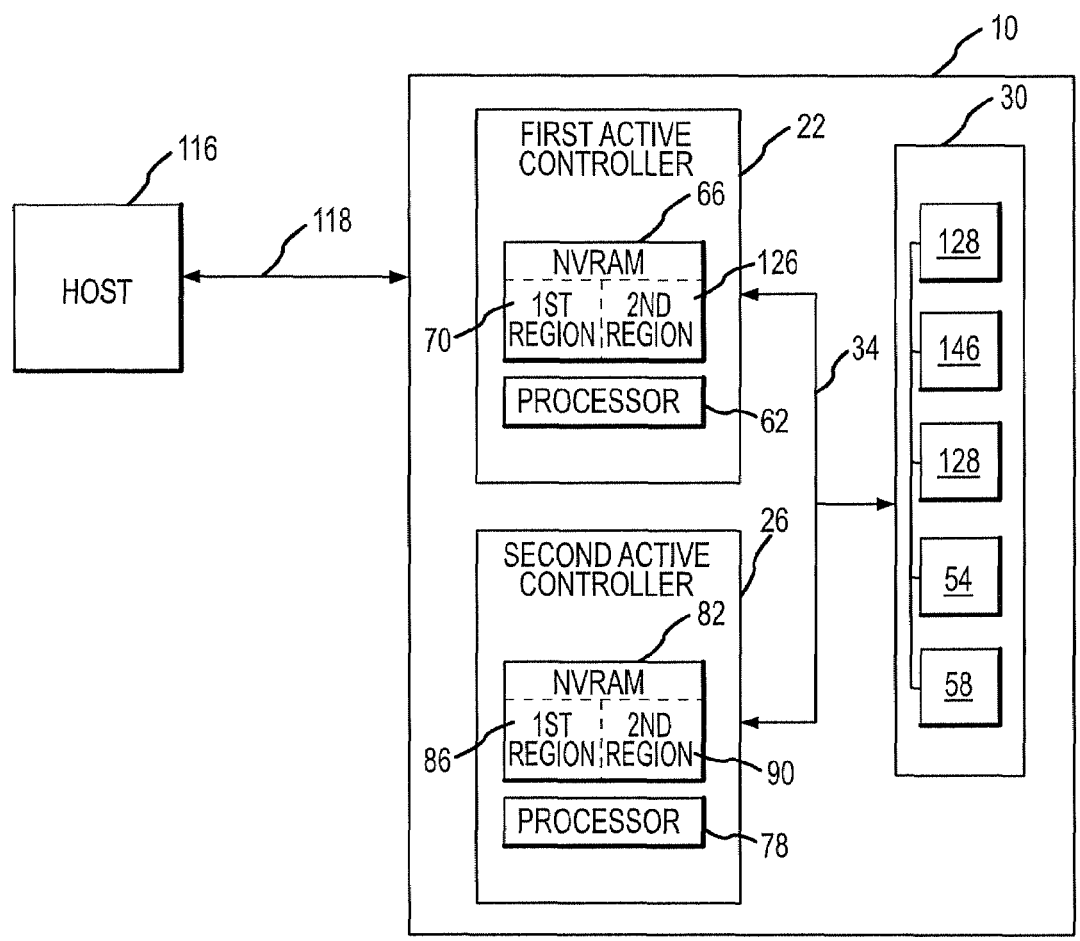
FIG. 1 is a block diagram representation of traditional memory storage system.
Figure 4:
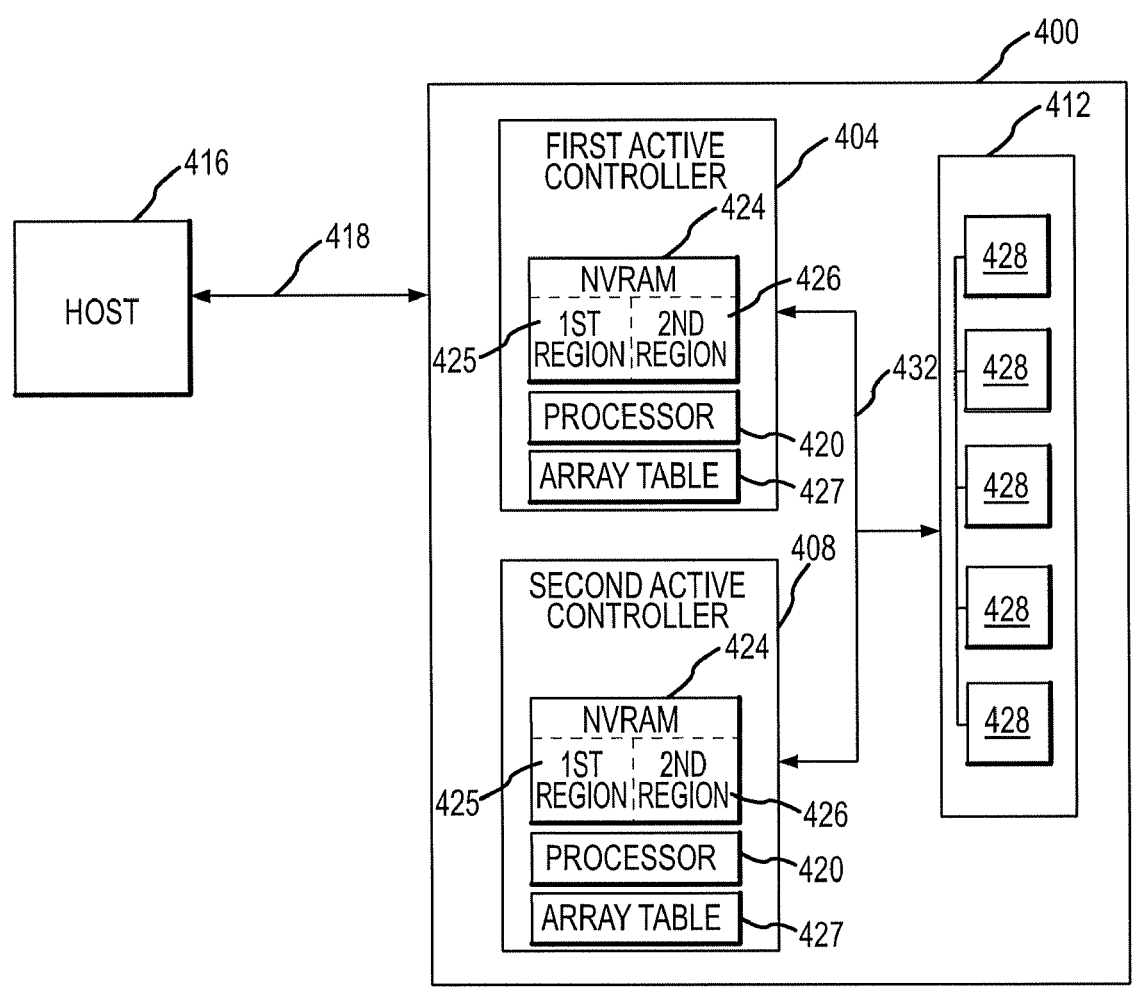
FIG. 4 is a block diagram representation of a memory storage system of the present invention.

FIG. 4 is a block diagram representation of a RAID storage system 400 utilizing a first active controller 404 and a second active controller 408, which communicate with a disk array 412. The RAID storage system 400 communicates with a host computer 416 through a host channel 418. Within each active controller 404, 408, there is a processing portion 420, a nonvolatile random access memory (NVRAM) portion 424, and an array table portion 427 which contains array serial numbers. The NVRAM 424 contains two regions, a first region 425 and a second region 426, which perform functions similar to those as described above with respect to the first and second memory regions of FIG. 1. The disk array 412 includes a number of disk drives 428, which are used for data storage. The first active controller 404, and the second active controller 408 communicate with the disk array 412 through a disk channel 432.

Figure 2:
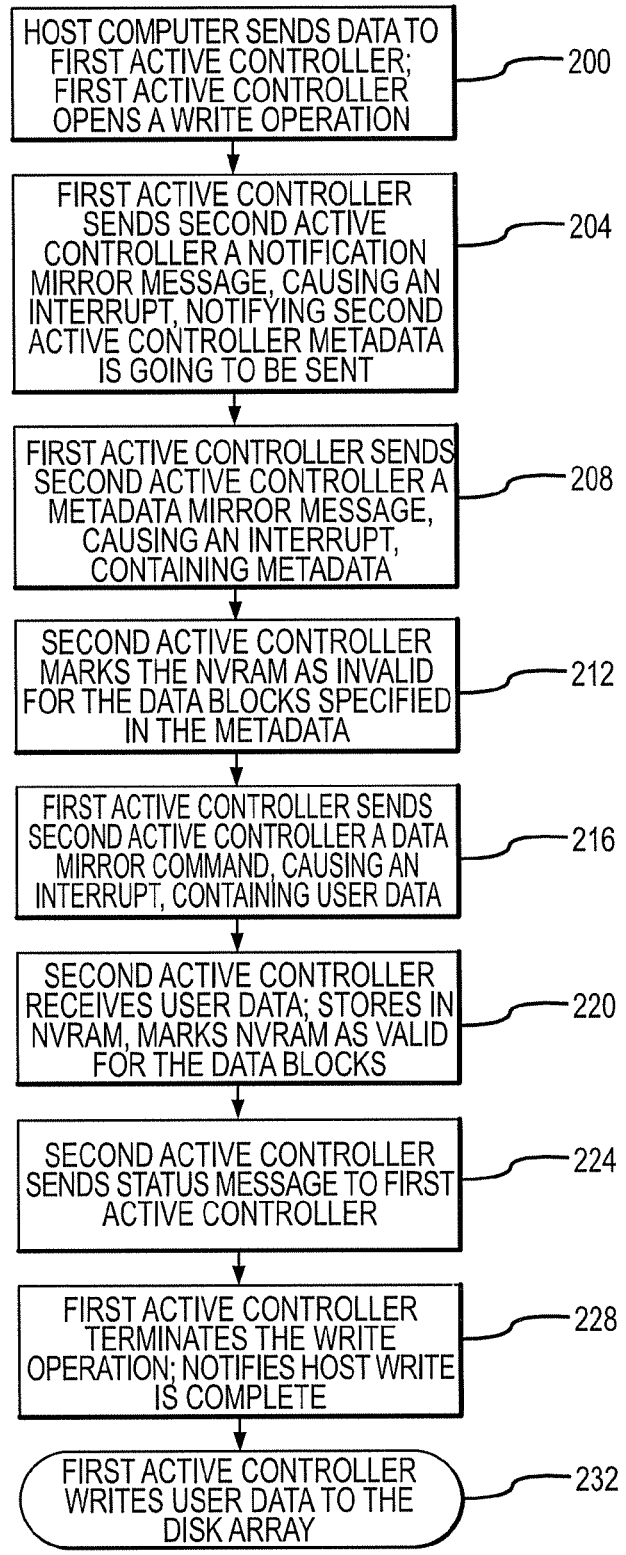
FIG. 2 is a flow chart representation of the steps taken to mirror data between controllers of an active-active controller pair.
Figure 5:
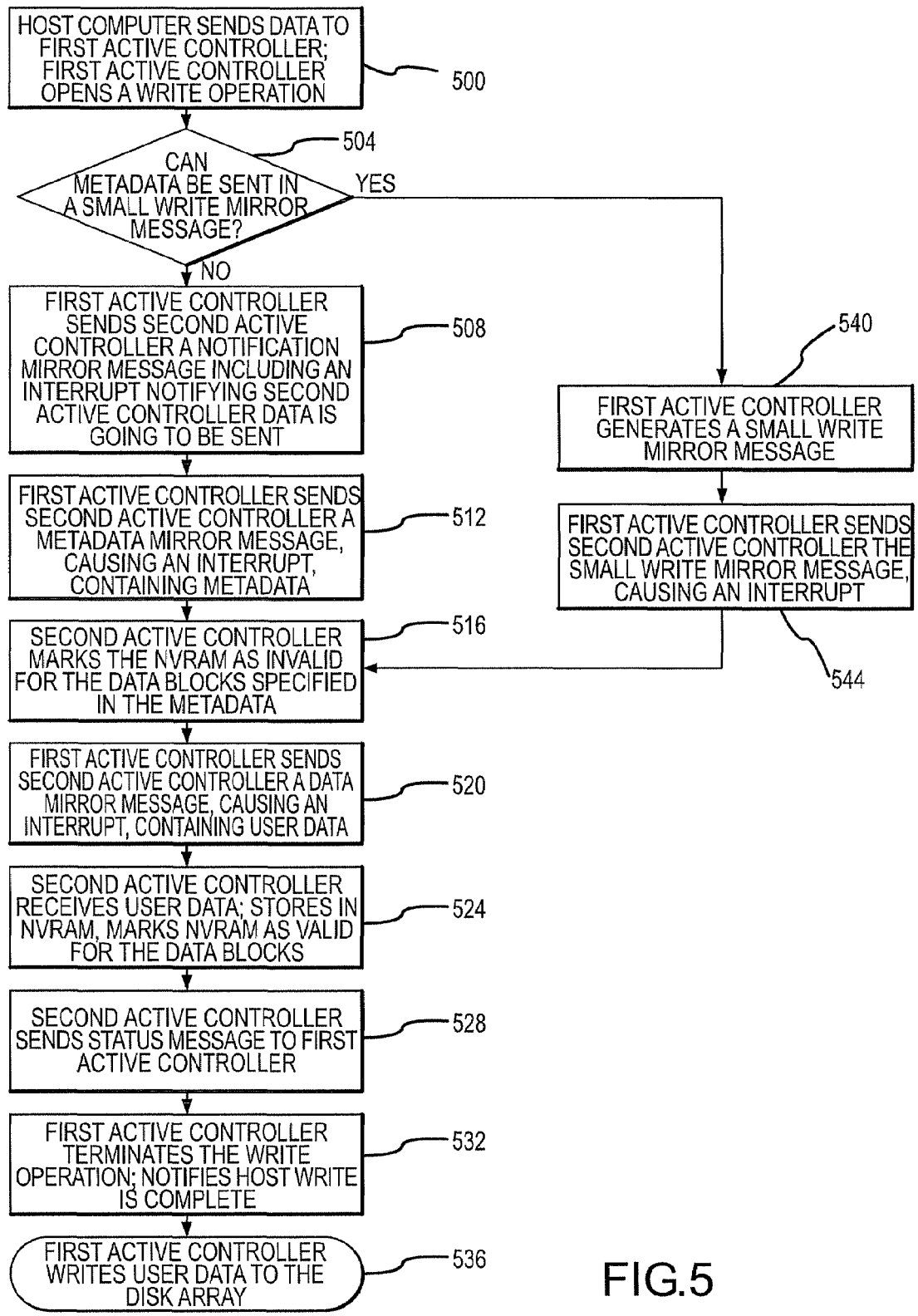
FIG. 5 is a flow chart representation of the steps taken to mirror data between controllers in an active-active controller pair of the present invention.

With reference now to FIG. 5, a flow chart representation of mirroring commands using the present invention is now described. Initially, indicated by block 500, the host computer 416 sends data to the first active controller 404, which opens a write operation. Next, as noted by block 504, the first active controller 404 determines whether the metadata associated with the user data can be mirrored using a small write mirror message. This determination, as well as the structure and contents of the small write mirror message will be described in detail below. If a small write mirror message cannot be used, the first active controller 404 sends a notification mirror message, which causes an interrupt to the second active controller 408, notifying the second active controller 408 that data is going to be mirrored, as noted by block 508. The contents of the notification mirror message are similar to the contents of the notification mirror message described above with respect to FIG. 2. Next, as indicated by block 512, the first active controller 404 sends a metadata mirror message including metadata, which causes an interrupt to the second active controller 408. The contents of the metadata mirror message are similar to the contents of the metadata mirror message described above with respect to FIGS. 2 and 3. The second active controller 408 then marks its NVRAM 424 as invalid for the data blocks specified in the metadata, as noted by block 516. Next at block 520, the first active controller 404 sends a data mirror message containing the user data, which causes an interrupt to the second active controller 408. The second active controller 408 receives the user data, stores it in the appropriate NVRAM 424 location, and marks the NVRAM 424 as valid for the associated data blocks, as indicated by block 524. The second active controller 408 sends a status message back to the first controller, as indicated by block 528. The first active controller 404 upon receiving the status message sends the host computer 416 an indication that the write is complete, and terminates the write operation, as noted by block 532. The first active controller 404, at block 536, writes the user data to the disk array.

If the first active controller 404 determines that the metadata can be mirrored using a small write mirror message, the first active controller 404 generates the small write mirror message, as noted by block 540. Following the generation of the small write mirror message, the first active controller 404 sends the small write mirror message, which causes an interrupt, to the second active controller 408, as indicated by block 544. The small write mirror message, as will be described in more detail below, is a single SCSI command which includes information which allows the second active controller 408 to be placed on notice that data will be mirrored, and also allows the second active controller 408 to determine metadata information for the user data. Following the sending of the small write mirror message, the same operations are completed as described with respect to block 516 through block 536. As can be seen, when using a small write mirror message, the processor 420 of the second active controller 408 is interrupted a minimum of three times, as opposed to being interrupted a minimum of four times when the small write mirror message is not used.

As noted above, if the user data cannot be mirrored using a small write mirror message, the first active controller 404 sends a notification mirror message, which causes an interrupt, to the second active controller 408. As described above, the notification mirror message is a SCSI command which serves to simply place the second active controller 408 on notice that data is being mirrored. In one embodiment, the notification mirror message is a 10 byte SCSI command, with the first byte containing the hexadecimal number 3C.

When the second active controller 408 receives the notification mirror message and reads the 3C hexadecimal number it recognizes this as a mirror notification command. The second active controller 408 then prepares to receive the metadata mirror message from the first active controller 404.

Figure 3:
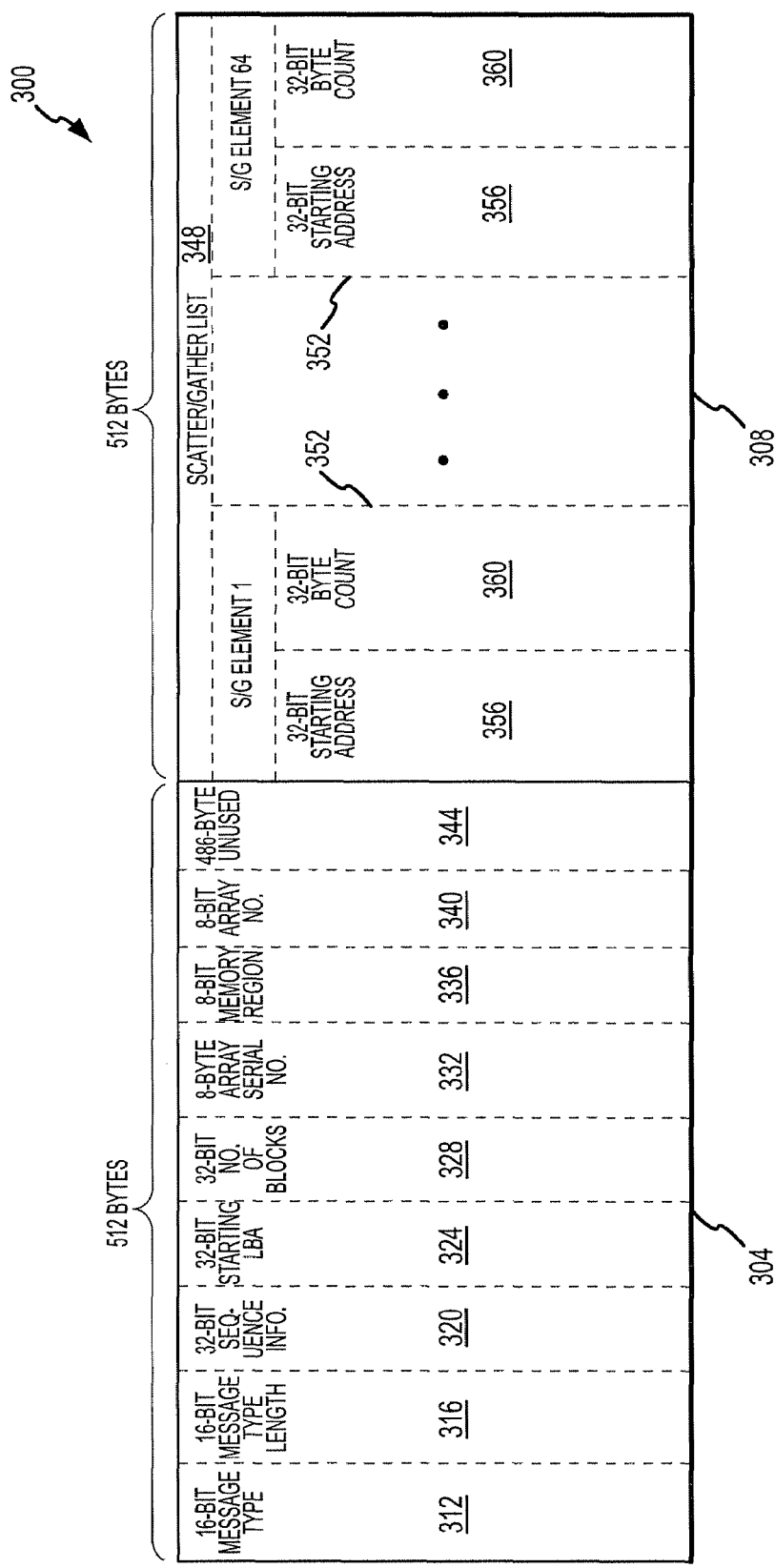
FIG. 3 is a block diagram representation of the information fields of a metadata mirror message.
Figure 6:
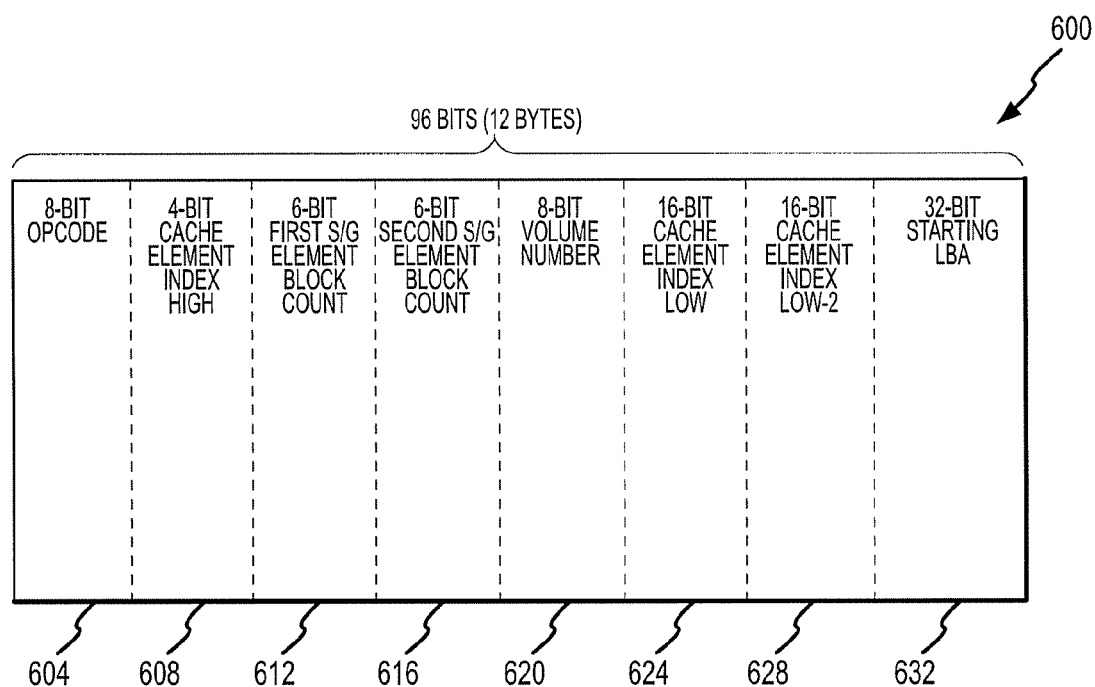
FIG. 6 is a block diagram representation of the information fields contained in a 12 byte command data block.

With reference now to FIGS. 3 and 6, a small write mirror message 600 is now described. FIG. 6 is a block diagram representation of one embodiment of the small write mirror message 600. In this embodiment, the small write mirror message 600 is a 12 byte command data block (CDB) custom SCSI command which includes fields to encode all the information contained in the notification mirror message and metadata mirror message. The small write mirror message 600 contains information which the controllers 404, 408 can decode to determine the information contained in a metadata mirror message 300. In the embodiment of FIG. 6, the equivalent of two scatter gather elements 352 can be encoded into the small write mirror message 600. Since each scatter/gather element contains metadata for up to 16 Kbytes of user data, a small write mirror message 600 can contain metadata for up to 32 Kbytes of user data.

Several of the fields described above with respect to the metadata mirror message 300 are modified in order to encode all of the necessary information into the 12 byte CDB. The first field of the small write mirror message 600 is an 8-bit opcode field 604. The opcode field 604 contains information related to the message type, and the region in NVRAM 424 where the associated data will be written. In one embodiment, there are two different opcodes which may be sent in the opcode field 604, a first opcode (hexadecimal A0) used by the first active controller 404 when mirroring data to the second active controller 408, and a second opcode (hexadecimal B0) used by the second active controller 408 when mirroring data to the first active controller 404. Each opcode contains appropriate information regarding whether the first region 425 or the second region 426 of the NVRAM 424 will be used for storage of the mirrored data.

The scatter/gather elements are also modified in the small write mirror message 600. In one embodiment, each active controller 404, 408 can support a maximum of 128 Mbytes of NVRAM 424. The minimum data transfer size supported by the controllers 404, 408 in this embodiment is 512 bytes. This means that there are 262,144 possible starting destination addresses (128 MB/512 B=262,144) within the NVRAM 424. Thus, each 32 bit starting address within the NVRAM 424 can be encoded into an 18 bit descriptor. This descriptor can then be used to define the 32 bit starting address field 356. In one embodiment, a 20 bit descriptor is used. This descriptor can be used to encode up to 512 Mbyte of NVRAM 424 starting addresses, thus allowing for system memory upgrades without a requirement for significant changes in the software used for small write mirroring.

The byte count field 360 described above is also encoded differently using the small write mirror message 600. In the embodiment of FIG. 6, the controller generating the small write mirror message 600 determines the number of blocks the data for each scatter/gather element. When determining the blocks of data, the controller divides the number of bytes in the associated data by 512 bytes. The result is the number of blocks the data will occupy in the other controller's NVRAM 424. Each block is defined as 512 bytes because, as described above, the minimum write size supported by the controllers of this embodiment is 512 bytes, which is used to define the number of possible starting locations in NVRAM 424. The number of blocks is then recorded as a 6 bit block count.

Additionally, as described above, the disk array 412 may include more than one array of disks, and each array of disks can include more than one RAID array. As described above with respect to the metadata mirror message 300, array serial number and array number each have an 8 byte field. In one embodiment, each controller 404, 408 creates an array serial number table 427. The array serial number table 427 contains information on each controller's 404, 408 array serial numbers and array numbers, which is then encoded into an 8 bit volume number for each controller 404, 408. Thus, in this embodiment, each controller 404, 408 can support up to 256 RAID arrays. The array table 427 only changes when an array is added or deleted from a controller 404, 408, and gets updated each time such an event occurs. The controllers 404, 408 can use this 8 bit volume number to look up the array serial number and the array number that data is to be written to from the array table 427.

Referring again to FIG. 6, the remaining fields of the 12 byte small write mirror message 600 are now described. Following the above described opcode field 604, is a 4 bit cache element index high field 608, which contains the upper four bits of both 20 bit descriptors. Next is a 6 bit first scatter/gather element block count 612 field, followed by a 6 bit second scatter/gather element block count 616 field. Next is a 8 bit volume number 620 field, containing the volume number which is used to obtain the array serial number and array number from the array table. Following the volume number 620 field is a 16 bit cache element index low 624 field, which contains the lower 16 bits of the 20 bit descriptor for the first scatter/gather element. Next is a 16 bit cache element index low2 628 field, which contains the lower 16 bits of the 20 bit descriptor for the second scatter/gather element. Finally, there is a 32 bit starting LBA 532 field, which contains the starting LBA location in the disk array that the user data is to be written to. It will be understood that the above-described fields may be recorded into the small write mirror message 600 in any sequence, and the small write mirror message 600 is not limited to the sequence of fields as described in this embodiment.

Figure 7:
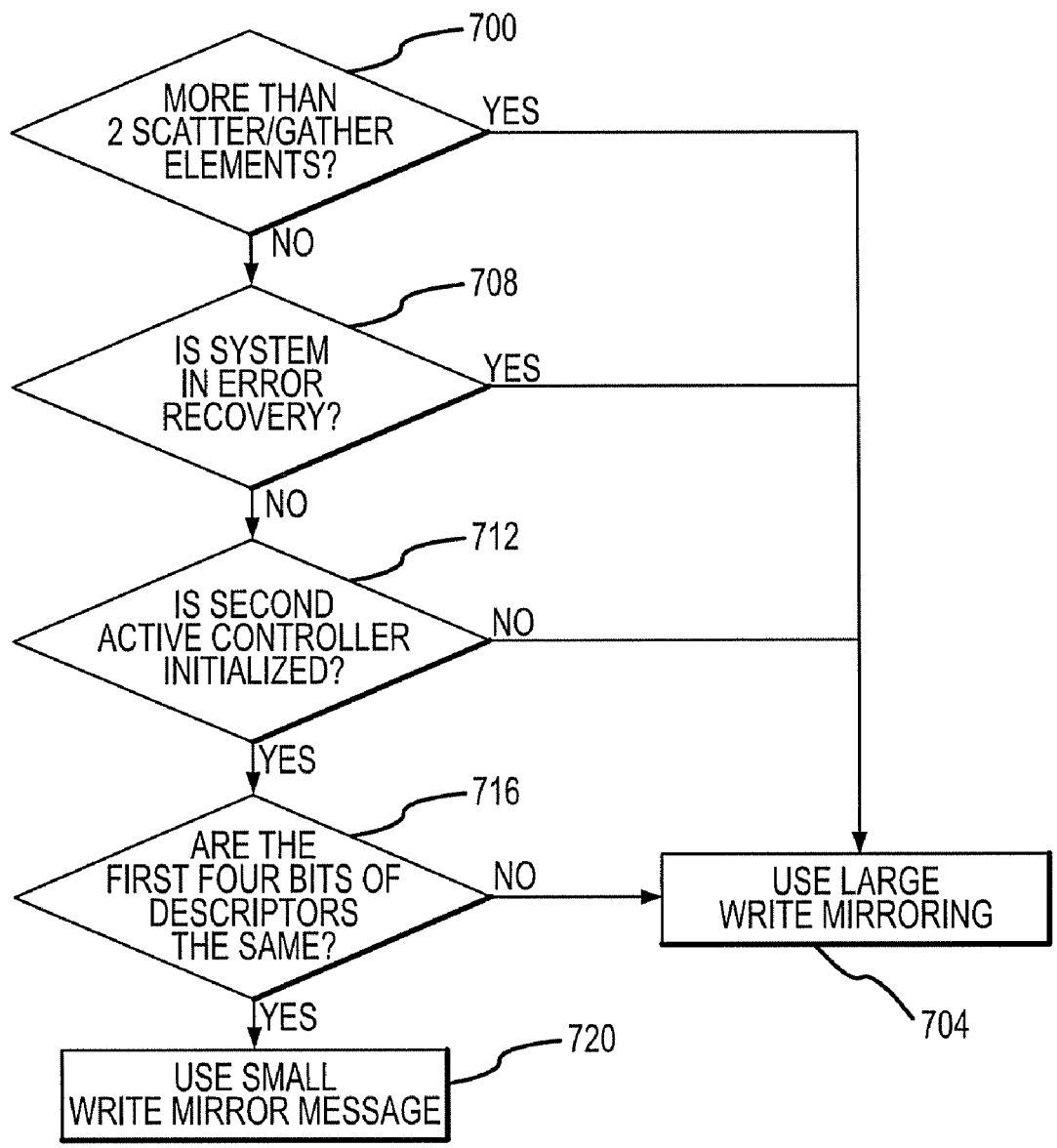
FIG. 7 is a flow chart representation of the steps a controller takes when determining whether to use a small write mirror message.

As noted above with respect to block 504 of FIG. 5, prior to generating and sending a small write mirror message, the first active controller 404 must determine if a small write mirror message can be used. With reference now to FIG. 7, a flow chart representation of the steps a controller takes to make this determination is described. As noted by block 700, the first active controller 404 first determines the number of scatter/gather elements which will be used in the metadata. If this number is greater than two, the large write mirroring is used, as noted by block 704. As used here, large write mirroring is the mirroring as described with respect to blocks 508 through 536 of FIG. 5. If the first active controller 404 determines that two or less scatter gather elements are required for the scatter/gather list, it then determines if the system is in an error recovery mode, such as a recovery from a controller failure, as noted by block 708. If the system is in an error recovery mode, the large write mirror message is used, as indicated by block 704. If the system is not in an error recovery mode, the first active controller 404 then determines if the second active controller 408 has been initialized, as noted by block 712. If the second active controller 408 has not been initialized, the first active controller 404 assumes that the array table 427 is not current, and the large write mirror message is used, as noted by block 704.

If the second active controller 408 has been initialized, the first active controller 404 determines if the 20 bit descriptors contain common values for the upper four bits, as noted by block 716. As described above with respect to FIG. 6, the 20 bit descriptors are recorded in the small write mirror message 600 in two separate fields. The upper four bits for each 20 bit descriptor are stored in a common field, with the lower 16 bits for each descriptor stored in separate fields. In most instances, the upper four bits of the 20 bit descriptors will be common, because the difference in the starting NVRAM 424 LBA for both scatter/gather elements will generally be relatively small, thus the most significant four bits of the 20 bit descriptor will generally be common to both descriptors. However, in some instances the upper four bits of each descriptor may not be common. In these cases, the small write mirror message of the embodiment shown in FIG. 6 cannot be used to mirror metadata information, and the large write mirror message is used, as noted by block 704. In making this determination, the controller computes the 20 bit descriptors, and the upper four bits are compared. If the upper four bits of each descriptor are common, the small write mirror message is used, as noted by block 720. It should be noted that one 18 bit field for each descriptor could be used, rather than a 20 bit descriptor of the embodiment shown in FIG. 6. This would allow the small write mirror message to be used even when the most significant bits of the descriptors are not common, although it would not allow for increases in the amount of NVRAM within a controller.

It should be understood that the above description is one preferred embodiment of the present invention, and that several alternative embodiments are also available. For example, a CDB of greater than 12 bytes could be used to encode the metadata information. This would allow the possibility of using a small write mirror message for user data which is greater than 32 Kbytes, and up to 64 Kbytes. In the preferred embodiment described above, a 12 byte CDB is used based on limitations present in common ASIC SCSI controller implementations. As mentioned above, many SCSI controllers are able to accept SCSI commands of varying sizes, with common command sizes being 10 bytes and 12 bytes, and a maximum command size being 16 bytes. If a SCSI command is greater than 12 bytes, many SCSI controllers must perform additional functions in order to receive and process the SCSI command. Thus, if a larger CDB is used, the performance enhancements resultant from the reduced interrupts may be negated by the additional processing associated with the larger SCSI command. However, if an application uses a SCSI controller which is capable of receiving a SCSI command of larger than 12 bytes without having to perform additional functions, a larger CDB can be used with additional fields to encode metadata for more than 32 Kbytes of user data. Additionally, in certain applications it may be advantageous to use a larger CDB even with a SCSI controller which must perform additional functions to receive the command, such as an application where gains are achieved when the amount of mirrored data is reduced. Such alternative implementations are considered to be well within the ability of one of ordinary skill in the art.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best modes presently known of practicing the inventions and to enable others skilled in the art to utilize the inventions in such, or in other embodiments, and with the various modifications required by their particular application or uses of the invention. It is intended that the appended claims be construed to include alternative embodiments to the extent permitted by the prior art.

What is claimed is:

1. A method for mirroring data using two controllers in a storage system, comprising:
    determining that metadata relating to data to be mirrored by a first controller to a second controller can be sent in a small write mirror message;
    providing a first message comprising a write mirror message that includes said metadata relating to data to be mirrored by a first controller to a second controller and in which said first message including said metadata is not greater than 128 bits, with said first message being part of a first mirroring operation, wherein said first message is generated by said first controller, and wherein said first message comprises an initial notification message; and
    continuing with said first mirroring operation after said providing a first message by providing a second message comprising a data mirror message that includes user data to said second controller, wherein said first message is associated with a first number of interrupts, wherein in response to determining that metadata cannot be sent in a small write mirror message a second message is sent and is associated with a second number of interrupts, and wherein said first number of interrupts is less than said second number of interrupts.

2. A method, as claimed in claim 1, further comprising:
    prior to said providing a first message, determining that data associated with said first mirroring operation is not greater than a predetermined number of bytes.

3. A method, as claimed in claim 2, wherein:
    said determining step includes ascertaining by said first controller that said data associated with said first mirroring operation is no greater than 32 Kbytes.

4. A method, as claimed in claim 2, wherein:
    said first controller communicates with a second controller using a Small Computer System Interface (SCSI) protocol and in which said predetermined number of bits in said message relates to said Small Computer System Interface (SCSI) protocol.

5. A method, as claimed in claim 1, wherein:
    said continuing step includes sending a write complete message related to completion of said first mirroring operation.

6. A method, as claimed in claim 1, further comprising:
    determining that second data associated with a second mirroring operation has a greater number of bits than a predetermined number of bits and sending an additional message to said second controller that does not include metadata.

7. A method, as claimed in claim 1, wherein:
    said first message causes a first interrupt to said second controller and the minimum number of interrupts to said second controller for said first mirroring operation is three interrupts.

8. A method for mirroring using two controllers in a storage system, comprising:
    making a determination related to contents of a first message with a first controller, wherein said first message is to be sent by said first controller to a second controller as part of a first mirroring operation, and wherein said first message is a message providing a first notification to the second controller that data will be mirrored to the second controller; and producing said first message having contents that depends on said making step, wherein:
1) when said making step determines that data to be sent comprises less than or equal to a predetermined number of bits such that a small write mirror message can be sent, said first message includes metadata information for user data associated with the first mirroring operation, wherein said first message is associated with a first number of interrupts; and
2) when said making step determines that said data is greater than said predetermined number of bits, at least less than all of said metadata associated with said first mirroring operation is not included with said first message, wherein said first message is associated with a second number of interrupts that is greater than said first number of interrupts.

9. A method, as claimed in claim 8, further comprising:
sending said first message to said second controller and recognizing said message by said second controller including whether said first message includes said metadata.

10. A method, as claimed in claim 8, wherein:
said first message causes a first interrupt to said second controller when said first message includes said metadata, with said first interrupt being one of three interrupts and said three interrupts being the minimum number of interrupts for said first mirroring operation.

11. A method, as claimed in claim 8, wherein:
said first controller communicates with said second controller for said first mirroring operation using Small Computer System Interface (SCSI) protocol and said predetermined number of bits depends on SCSI protocol operations.

12. An apparatus for mirroring data using two controllers in a storage system, comprising:
a first controller that generates one of a first message and a second message depending on an amount of data to be sent by said first controller to a second controller as part of a first mirroring operation, wherein said first message is sent in response to determining that said amount of data to be sent by said first controller is less than or equal to a predetermined number of bytes, wherein said first message comprises a small write mirror message that includes metadata related to user data included in said first mirroring operation; and a second controller that receives said data from said first controller, wherein when said first or second message is sent by said first controller said first or second message comprises an initial notification message to said second controller related to the first mirroring operation, wherein:
when said first message is generated, said first mirroring operation is associated with a first number of interrupts and, when said second message is sent, said first mirroring operation is associated with a second number of interrupts, with said second number of interrupts being greater than said first number of interrupts.

13. An apparatus, as claimed in claim 12, wherein:
said first message includes all metadata for said first mirroring operation and said second message includes at least less than all of said metadata for said first mirroring operation and in which said one of said first message and said second message is the first communication from said first controller to said second controller for said first minoring operation.

14. An apparatus, as claimed in claim 12, wherein:
said first message includes metadata and the number of bits in said first message relates to SCSI protocol.

15. An apparatus, as claimed in claim 12, wherein:
said first message includes metadata and command related information and said first message is no greater than 128 bits.

16. An apparatus, as claimed in claim 12, wherein:
when said second message is generated, metadata is sent to said second controller after an interrupt that is different from the interrupt associated with said second message.

* * * * *